United States Patent Office 3,684,714
Patented Aug. 15, 1972

3,684,714
CERAMIC BODIES FOR ELECTROMECHANICAL TRANSDUCERS
Klaus Fredrich Leonhard Carl, and Karl Heinz Hardtl, Aachen, Germany, assignors to U.S. Philips Corporation, New York, N.Y.
Filed Oct. 8, 1970, Ser. No. 79,074
Claims priority, application Germany, July 29, 1970, P 20 37 643.6
Int. Cl. C04b 35/46, 35/48, 35/50
U.S. Cl. 252—62.9
3 Claims

ABSTRACT OF THE DISCLOSURE

Ceramic bodies for use in electromechanical transducers consisting mostly of lanthanum oxide containing solid solutions of lead zirconate and lead titanate having a composition defined by the formula $$Pb_{1-1.5y}La_y(Zr_xTi_{1-x})O_3$$

Figure 1:
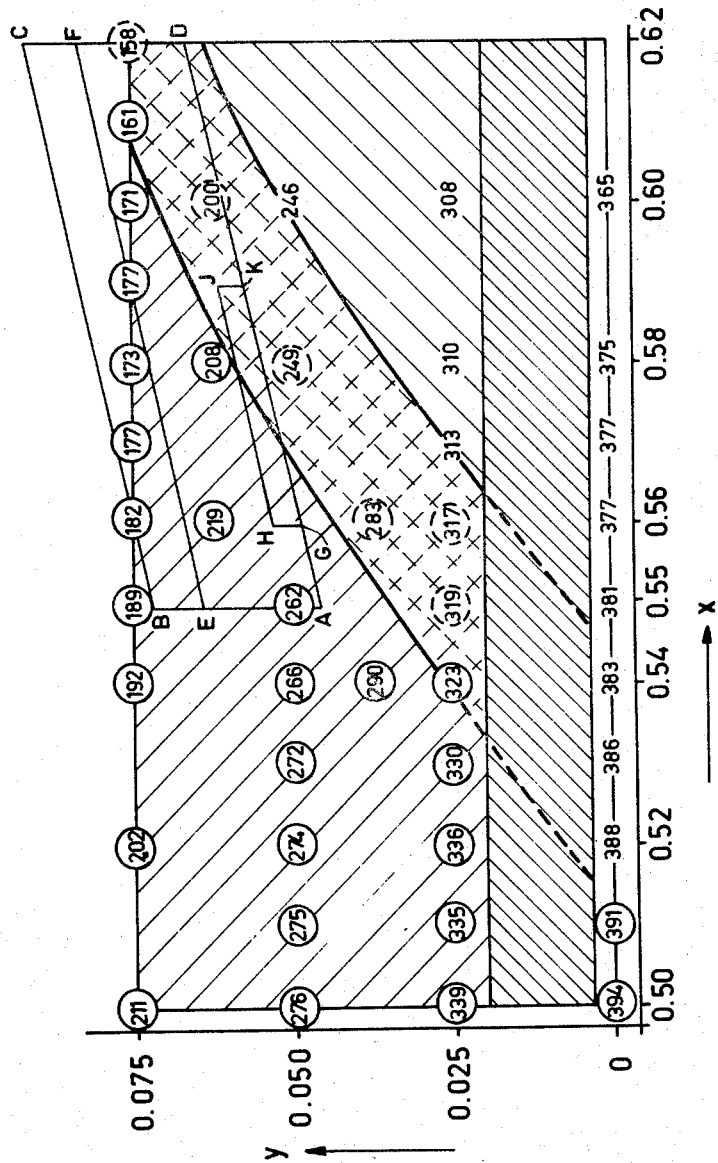

wherein
$0.55 \leq x \leq 0.62$ and $(0.3x-0.118) \leq y \leq (0.3x-0.094)$

---

The invention relates to ceramic bodies for electromechanical transducers and to such bodies comprising electromechanical transducers.

It is known that ceramic bodies based on solid solutions of lead zirconate (PbZrO$_3$) and lead titanate (PbTiO$_3$) are used for such transducer. It is also known that in the system lead zirconate-lead titanate extreme values of the electromechanical properties which are important when using transducers occur in compositions in the vicinity of the morphotropic phase limit of the system. Furthermore, it is known that such extreme values are increased by small additions of different oxides, for example La$_2$O$_3$.

Not all electromechanical properties of the elements are of equally great significance in certain applications; in the relevant case some of them are of particularly great significance. Thus, for example, the planar coupling factor and the dielectric constant are of particular significance for use of transducers in pick-up elements. Both magnitudes should have a high value.

Such La$_2$O$_3$-containing compositions in the vicinity of the morphotropic phase limit of the system lead zirconate-lead titanate are known, the highest value of the planar coupling factor being approximately 55% and the highest value of the dielectric constant being 1580 (U.S. patent specification 2,911,370). These values have been given for the following composition:

$$Pb(Zr_{0.54}Ti_{0.46})O_3 + 1\% \text{ by weight of } La_2O_3$$

It would be desirable that ceramic materials for use in pick-up elements and consisting of lead zirconate-lead titanate have higher values of the planar couping factor and the dielectric constant. A higher value of the planar coupling factor would increase the electromechanical output. A higher value of the dielectric constant is desirable in connection with the electrical adaptation of the element of the pick-up head to the electronic amplifier. During the experiments which led to the present invention it was found that a shift in the morphotropic phase limit which separates the ranges of the solid solutions having tetragonal and rhombohedral structures, respecetively, occurs at Zr-richer compositions having an increased La-content. The transition from tetragonal to rhombohedral structure is effected gradually within a broad range within which both structures occur simultaneously.

It was found that there is a range of compositions, in this connection referred to as the range of ceramic materials according to the invention, which range is partially located in the said range within which both crystal structures occur and partially in the range of tetragonal structures in which the high values of the planar coupling factor are accompanied by high values of the dielectric constant of the ceramic materials. This combination of high values of these magnitudes means that these ceramic materials are eminently suitable for uses in which such a combination of properties is desired, for example, for pick-up elements.

The present invention relates to ceramic bodies whose compositions correspond to the formula $$Pb_{1-1.5y}La_y(Zr_xTi_{1-x})O_3$$

which are located in the range of ceramic materials according to the invention and to such bodies comprising electromechanical transducers.

In a bidimensional representation (FIG. 1: x-direction: Zr-content; y-direction=La-content) the lower limit of the range is indicated by a straight line which connects the points A($x=0.55$; $y=0.047$) and D ($x=0.62$; $y=0.068$) and the upper limit is indicated by a straight line which connects the points B ($x=0.55$; $y=0.071$) and C ($x=0.62$; $y=0.092$). $x$ and $y$ represent the atomic fractions of the relevant elements. The range of ceramic materials according to the invention is shown by the tetragon ABCD in such a bidimensional representation.

The figure shows the shift of the morphotropic phase limit with an increasing Zr- and La-content. The numbers indicated in the figure denote the Curie temperatures in ° C. for the relevant compositions. For compositions having a tetragonal structure the numbers are shown in a solid-line circle. The numbers for compositions having a uniform rhombohedral structure are shown without a circle. The numbers for compositions shown in a broken-line circle relate to compositions in which both structures occur.

The present invention exclusively relates to ceramic bodies for electromechanical transducers, particularly for pick-up elements and to such bodies comprising electromechanical transducers, which bodies consist mainly of lanthanum oxide-containing solid solutions of lead zirconate and lead titanate, and are characterized in that the composition of the lanthanum oxide-containing mixed crystals is defined by the formula:

$$Pb_{1-1.5y}La_y(Zr_xTi_{1-x})O_3$$

wherein $x$ and $y$ satisfy the following conditions:

$0.55 \leqslant x \leqslant 0.62$ and $(0.3x-0.118) \leqslant y \leqslant (0.3x-0.094)$ The composition represented by this formula are located within the tetragon ABCD of FIG. 1.

Ceramic bodies according to the invention whose compositions are located within this tetragon having coupling factors whose values lie above 50% and dielectric constants whose values lie above 2000.

Bodies whose compositions are located within the tetragon AEFD of FIG. 1 are preferred because their coupling factor lies above 60%.

These compositions are defined by the formula:

$$Pb_{1-1.5y}La_y(Zr_xTi_{1-x})O_3$$

wherein $0.55 \leqslant x \leqslant 0.62$ and $(0.3x-0.118) \leqslant y \leqslant (0.3x-0.105)$ Due to the high values of the coupling factor of approximately 70%, the compositions within the tetragon GHIK of FIG. 1 are particularly interesting.

Figure 2:
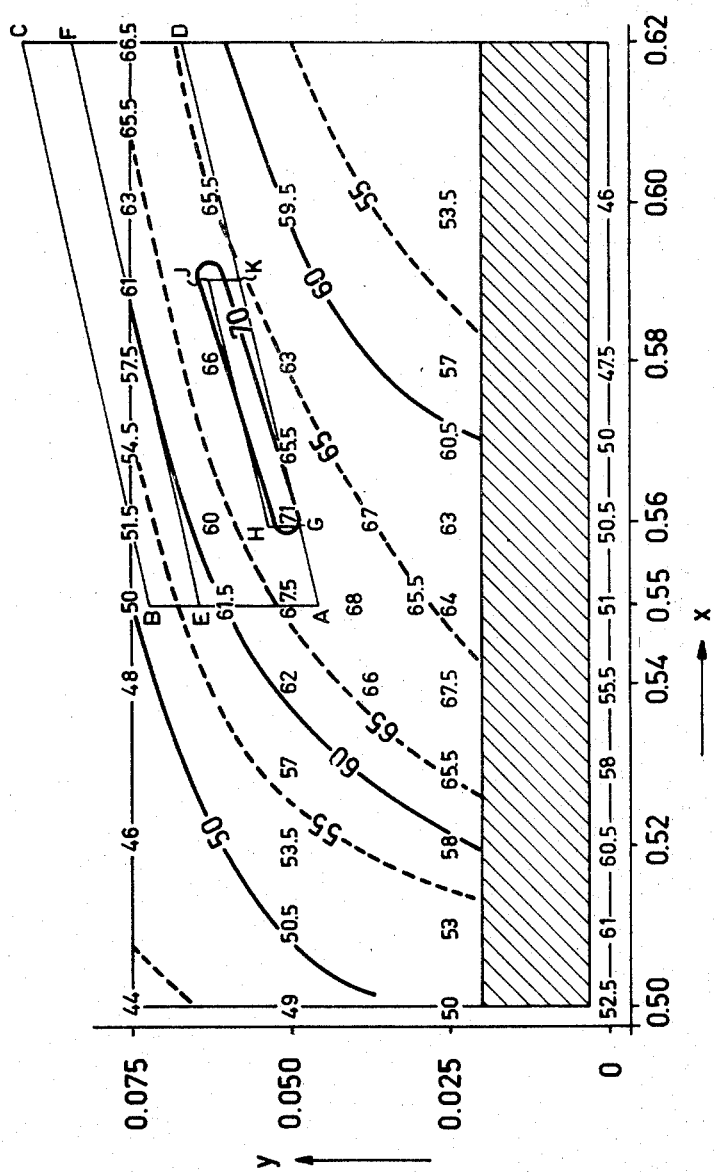

These compositions are defined by the formula:

$$Pb_{1-1.5y}La_y(Zr_xTi_{1-x})O_3$$

wherein $0.56 \leqslant x \leqslant 0.59$ and $(0.3x-0.118) \leqslant y \leqslant (0.3x-0.113)$ FIG. 2 shows the values of the coupling factors in percent for the compositions for which the Curie temperatures are given in FIG. 1. This figure includes tetragons which correspond to the tetragons in FIG. 1. Apparent therefrom is the above-mentioned statement about the relationship between the coupling factors and the compositions in the ranges.

Figure 3:
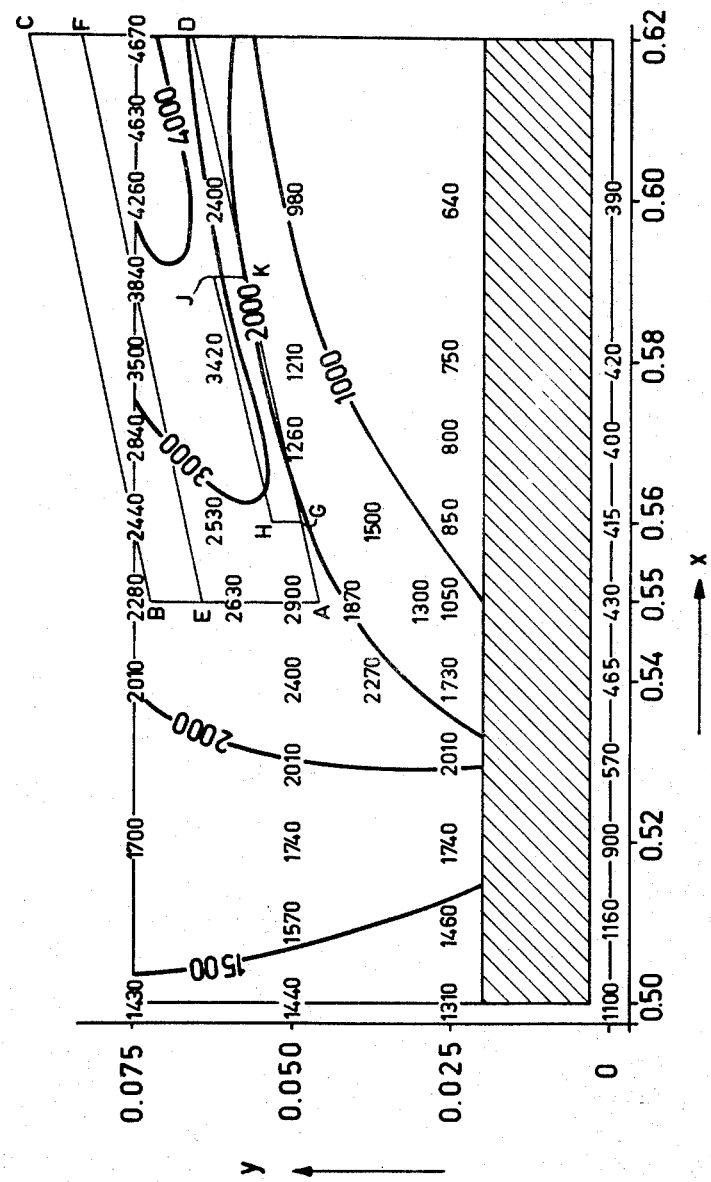

FIG. 3 shows the values of the dielectric constants for the compositions for which the Curie temperatures are given in FIG. 1. This figure also includes tetragons which correspond to those of FIG. 1. It is found therefrom that the compositions which are located within the tetragons have values of the dielectric constant ranging from high to very high. The ceramic bodies according to the invention may be manufactured in the manner known for the manufacture of ceramic bodies which consist of mixed crystals of lead zirconate and lead titanate.

It has been found that it is recommended to take steps by which a reduction in the PbO content during sintering is prevented. This is achieved in that a separate $PbZrO_3$ sample is introduced into the holder containing the bodies to be sintered. As a result of this step an addition of an extra quantity of PbO to the body to be sintered becomes superfluous because $PbZrO_3$ has a PbO vapor pressure which is approximately twice as high as that of mixed crystals of lead zirconate and lead titanate at the sintering temperature, for example, 1350° C.

The ceramic bodies according to the invention may be manufactured by weighing PbO, $ZrO_2$, $TiO_2$ and $La_2O_3$ in the desired quantities and by intimately mixing them during a dry-grinding process. The mixed powders are presintered at 800° C., subsequently pulversized and intensively ground and are then pressed isostatically without a binder to form bodies (pressure approximately 4 kbar). The bodies obtained in this manner are sintered at approximately 1350° C. in an oxygen atmosphere in covered platinum-clad crucibles consisting of aluminum oxide.

Disks having a thickness of 400 μm. and a diameter of 5.3 mms. were made by mechanical process from the bodies manufactured in this manner for the purpose of electrical measurements. After superficial polishing, silver electrodes were vapor-deposited in a high vacuum. The samples were polarized for 5 minutes at 120° C. in silicon oil and at an electrical field strength of 5 kv./mm. and were cooled while maintaining the applied voltage. Unless otherwise stated, the measurements whose results are shown in the figures were performed at room temperature 24 hours after polarization.

It was found by means of metallographic "Schliff" images that the bodies according to the invention are densely sintered ceramic materials whose porosity is between 1 and 2% and whose mean grain size is approximately 3 μm. Electrodes may be provided in known manner on the ceramic bodies according to the invention, for example, by means of vapour deposition of silver electrodes in a vacuum. The bodies provided with electrodes may be polarized in known manner.

The manufacture and the method of polarization of a

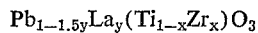

ceramic material with $y=0.050$ and $x=0.56$ will be described extensively below. 31.1 g. of PbO; 5.3 g. of $TiO_2$, 10.4 g. of $ZrO_2$ and 1.22 g. of $La_2O_3$ were used.

The powders were intimately mixed for 1½ hours in rolling flasks consisting of polyvinylchloride and containing $Al_2O_3$ pellets and were thereafter presintered for 10 hours at a temperature of 800° C. in covered $Al_2O_3$ trays. After a grinding process which furthermore took 1 hour, prismatic samples of 7 mm. x 7 mm. x 20 mm. were formed and were pressed without a binder at an isostatic pressure of 4 kbar.

Every time 8 of these samples were sintered for two hours in covered platinum-clad $Al_2O_3$ trays at a temperature of 1350° C. in an $O_2$-atmosphere. To prevent PbO evaporation, a $PbZrO_3$ sample was added every time to the 8 samples; the high PbO vapour pressure of $PbZrO_3$ preventing the evaporation of PbO from the samples.

For the purpose of the electrical measurements the densely sintered samples having a density of between 98 and 99% of the theoretical density were formed to disks having a thickness of 400 μm. and a diameter of 5.3 mms. by means of a mechanical operation (sawing, lapping, polishing). Centric silver electrodes (thickness approximately 0.6 μm.) and a diameter of 5 mms. were vapor-deposited at a high vacuum on the polished surfaces.

All disks were polarized for 5 minutes at 120° C. in silicon oil and at an electrical field strength of 5 kv./mm. and were cooled while maintaining the applied voltage. The measurements were performed on three samples at a time, and this 24 hours after polarization. The measured values indicated are mean values of these three samples.

Samples having other compositions were manufactured and further treated in the same manner.

What is claimed is:

1. A ceramic body for electromechanical transducers and particularly for pick-up elements, characterized in that the body consists mainly of lanthanum oxide-containing solid solution of lead zirconate and lead titanate having a composition defined by the formula

wherein $0.55 \leqslant x \leqslant 0.62$ and $$(0.3x-0.118) \leqslant y \leqslant (0.3x-0.094)$$

2. A ceramic body for electromechanical transducers and particularly for pick-up elements as claimed in claim 1, characterized in that the body consists mainly of lanthanum oxide-containing solid solution of lead zirconate and lead titanate having a composition defined by the formula

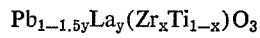

wherein $0.55 \leqslant x \leqslant 0.62$ and $$(0.3x-0.118) \leqslant y \leqslant (0.3x-0.105)$$

3. A ceramic body for electromechanical transducers and particularly for pick-up elements, characterized in that the body consists mainly of lanthanum oxide-containing solid solution of lead zirconate and lead titanate having a composition defined by the formula

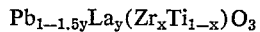

wherein $0.56 \leqslant x \leqslant 0.59$ and $$(0.3x-0.118) \leqslant y \leqslant (0.3x-0.113)$$

References Cited

UNITED STATES PATENTS

| | | | |
|---|---|---|---|
| 2,960,411 | 11/1960 | Brajer et al. | 252—62.9 X |
| 3,144,411 | 8/1964 | Kulcsar et al. | 252—62.9 |
| 3,264,217 | 8/1966 | Kulcsar | 252—62.9 |

FOREIGN PATENTS

| | | | |
|---|---|---|---|
| 843,920 | 9/1960 | Great Britain | 252—62.9 |

TOBIAS E. LEVOW, Primary Examiner

J. COOPER, Assistant Examiner

U.S. Cl. X.R.

160—39 R